Sept. 29, 1942.   C. B. SPASE   2,296,957
CLUTCH AND VIBRATION BALANCER
Filed Aug. 10, 1939
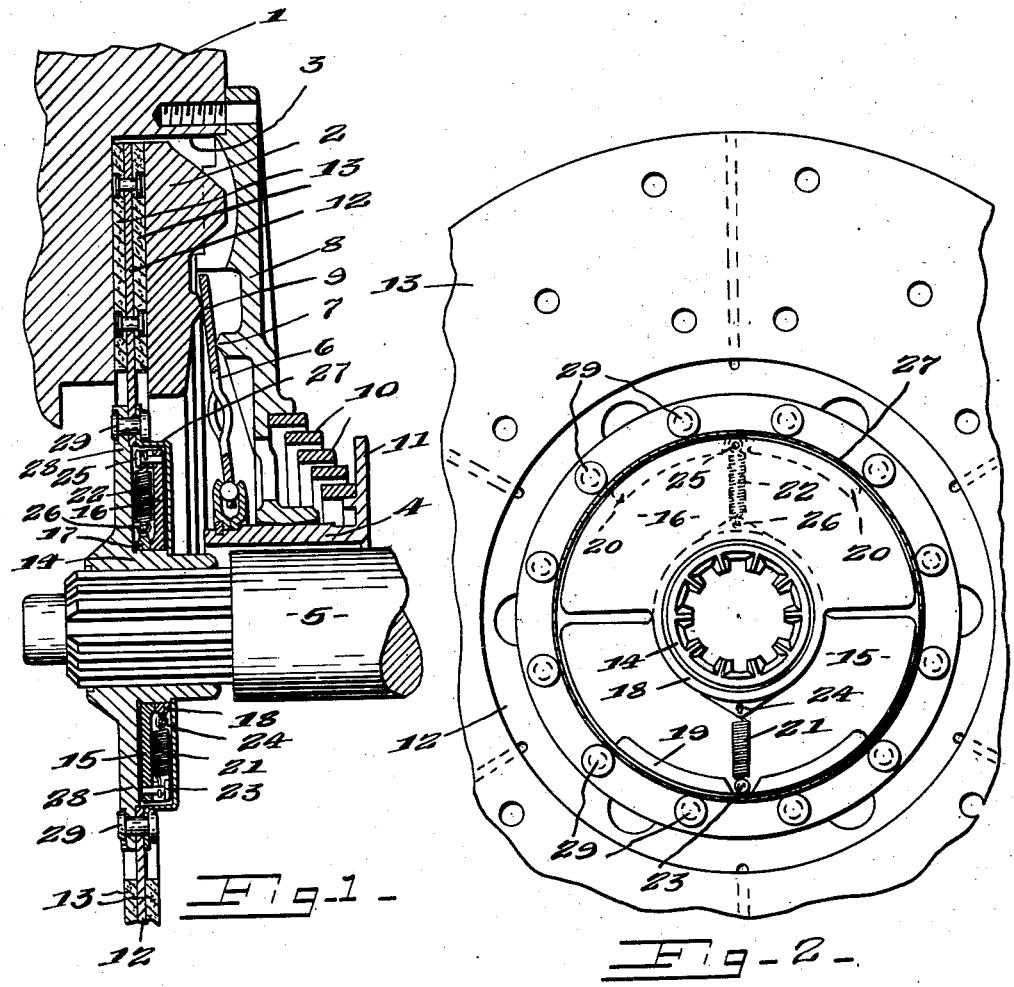
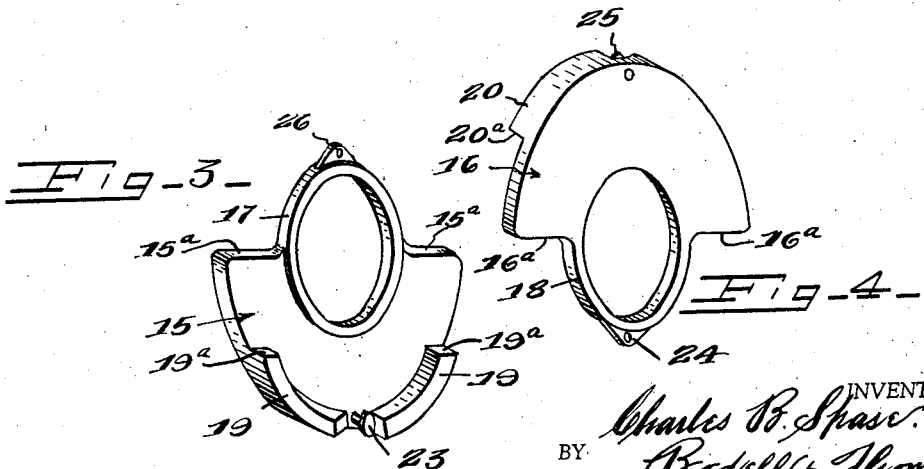
INVENTOR.
Charles B. Spase.
BY Bodell & Thompson.
ATTORNEYS.

Patented Sept. 29, 1942

2,296,957

UNITED STATES PATENT OFFICE 2,296,957

CLUTCH AND VIBRATION BALANCER

Charles B. Spase, Nedrow, N. Y., assignor to W. C. Lipe, Inc., Syracuse, N. Y., a corporation of New York Application August 10, 1939, Serial No. 289,440

9 Claims. (Cl. 74—574)

This invention relates to vibration balancers usable in connection with any rotating part, and particularly useful in a friction clutch, such as is used in motor vehicles, for balancing or neutralizing torque and other vibration. More specifically, it has for its object a vibration balancer including inert or inertia parts having hubs mounted on a rotating member, said parts being frictionally engaged with the rotating member to have a slipping action, and resilient elastic means, as a spring or springs, connecting the hub of each of the inert parts with the rim of the other of such parts.

The invention consists in the novel features and in the combinations and constructions hereinafter set forth and claimed.

In describing this invention, reference is had to the accompanying drawing in which like characters designate corresponding parts in all the views.

Figure 1 is a fragmentary sectional view of one type of conventional clutch used in the automotive field embodying this invention.

Figure 2 is a fragmentary elevation looking to the left in Figure 1.

Figures 3 and 4 are perspective views of the inert or inertia parts.

This vibration balancer is here illustrated as embodied in a conventional friction clutch of the type used in motor vehicles and is mounted on the driven element or clutch plate.

I designates the driving element of the clutch which is usually the fly wheel. 2 is the pressure ring also rotatable with the fly wheel and located in a recess 3 formed in the fly wheel.

4 designates the throw-out sleeve which is slidable axially of the clutch shaft 5. 6 are motion-transmitting levers for transmitting the motion of the sleeve 4 to the pressure ring, these levers fulcruming at 7 on the back plate 8 of the clutch and applying their force at 9 to the pressure ring 2.

10 is a clutch spring interposed between the back plate and a collar 11 on the throw-out sleeve 4.

12 designates the driven member or disk interposed between the pressure ring 2 and the bottom of the recess 3, this having friction facings 13 on opposite sides thereof. The disk is provided with a hub 14 splined on the clutch shaft 5. 15 and 16 designate respectively the inert or inertia parts mounted on the disk 12 or the hub 14 thereof and frictionally engaged therewith to have a slipping or slip-ring action. These inert parts are shown as segments of a disk and are preferably semi-discoidal, and each has a ring or hub 17 or 18 frictionally mounted on the hub 14. The friction between the hubs or rings 17, 18 and the hub 14 of the disk is usually sufficient but if more friction is desired, the inert members 15, 16 may frictionally engage the walls of the recess in which they are located at their peripheries or at their sides. The inert parts are oppositely-disposed with respect to each other, and in the illustrated embodiment of the invention, there are two of such parts, and hence they are diametrically disposed. The inert parts 15 and 16 are arranged in different planes, and each is provided with an angular flange 19 or 20 at the rim thereof, the flange of each extending toward the flange of the other inert part.

The resilient elastic means connecting each inert part 15 or 16 with the other part is here shown as radially extending springs 21, 22, the spring 21 being connected at its outer end at 23 to the rim of the inert part or segment 15 and at its inner end at 24 to the hub of the other inert part or segment 16, and the spring 22 is shown as connected at its outer end at 25 to the rim of the inert part or segment 16 and at its inner end at 26 to the hub 17 of the inert part 15. The springs are connected to the rims of parts 15, 16 midway between the ends of the arc of the segments. The relative movement of the segments of the inert members 15, 16 may be limited in any suitable manner, as by the ends 19a of the flanges coming in contact with the end of the semi-discoidal portion of the member 16 at 16a or the ends 20a of the flanges 20 of the discoidal member 16 engaging at 15a the discoidal portion of the other inert member 15.

When assembled in the clutch, the inert members, as seen in Figure 1, are located in an annular recess formed by a housing 27 offset from an annular flange 28 on the hub 14 and assembled to the disk 12 by the rivets 29 which secure the disk 12 to the flange 28 of the hub.

In operation, on the occurrence of torsional vibration, the inert members have a slip-ring action about the axis of the shaft 5, relatively to the hub 14, and each may have a movement relatively to the other in the same direction or in the opposite direction, such movements being resisted by the springs 21, 22. As the springs connect the two inert parts together, contrary movement of either is opposed by the other through the spring, and movement in one direction of either inert part is transferred to the other through the spring.

This balancer consisting of oppositely-disposed inertia parts or members is particularly simple, consists of few easily assembled parts and balances or tends to neutralize torsional vibrations, regardless of their source.

What I claim is:

1. The combination of a rotating member and a vibration balancer therefor including oppositely-disposed inert parts rotatably mounted on said member concentrically therewith to shift about the axis of said member, said parts being frictionally engaged with said member independently of each other to have a slipping action, and spring means connecting one of said parts to the other, said spring means extending radially and connected at one end to the outer portion of one part and its other end to the central portion of the other part.

2. The combination of a rotatable member and a vibration balancer therefor including oppositely-disposed inert parts, each including a segment and a hub rotatably mounted on said member, said parts being frictionally engaged with said member to have a slipping action, and a spring connecting the rim of one segment with the hub of the other part.

3. The combination of a rotating member and a vibration balancer therefor including oppositely-disposed inert parts, each including a part-discoidal body and a hub mounted on and frictionally engaged with said member to have a slipping action, and spring means connecting the rim of one body and hub of the other part.

4. The combination of a rotating member and a vibration balancer therefor including oppositely-disposed inert parts, each including a part-discoidal body and a hub mounted on and frictionally engaged with said member to have a slipping action, and spring means connecting the rim of one body and hub of the other part, the spring means normally extending radially relatively to the axis of rotation.

5. The combination of a rotating member and a vibration balancer therefor including oppositely-disposed segments, each having a hub frictionally mounted independently of the other on the rotating member to have a slip action, and an elastic resilient connection between one segment and the hub of the other segment.

6. The combination of a rotating member and a vibration balancer therefor including oppositely-disposed segments, each having a hub frictionally mounted independently of the other on the rotating member to have a slip action, and a radially-extending spring connected to one segment intermediate of the arc of the segment and to the hub of the other segment.

7. The combination of a rotating member and a vibration balancer therefor, said balancer including oppositely-disposed segments, each having a hub frictionally mounted on said member to have a slip action, the segments being arranged in different planes, and resilient elastic means between one segment and the hub of the other segment.

8. In a friction clutch, the combination of driving and driven rotating members, the driven member including a friction clutch plate having a hub for mounting on the driven clutch shaft, and a vibration balancer including oppositely-disposed segments mounted on the hub of the driven member and frictionally engaged with said member to have a slipping action, each segment having a hub mounted on the former hub and the segments being movable in different planes, and spring means connecting the hub of one segment and the rim of the other segment.

9. The combination of a rotating member and a vibration balancer therefor including inert parts rotatably mounted on said member concentrically therewith to shift about the axis of said member, said parts comprising segments oppositely disposed in radial directions relatively to each other and having hubs frictionally engaged with said member independently of each other to have a slipping action, said segments being located in different planes, whereby they lap each other during relative movement of the same about their axis, the frictional engagement being the only connection between said parts and the rotating member, each of said parts having means extending into the path of the other part for limiting the circumferential displacement of the parts relatively to each other.

CHARLES B. SPASE.